Figure 1:
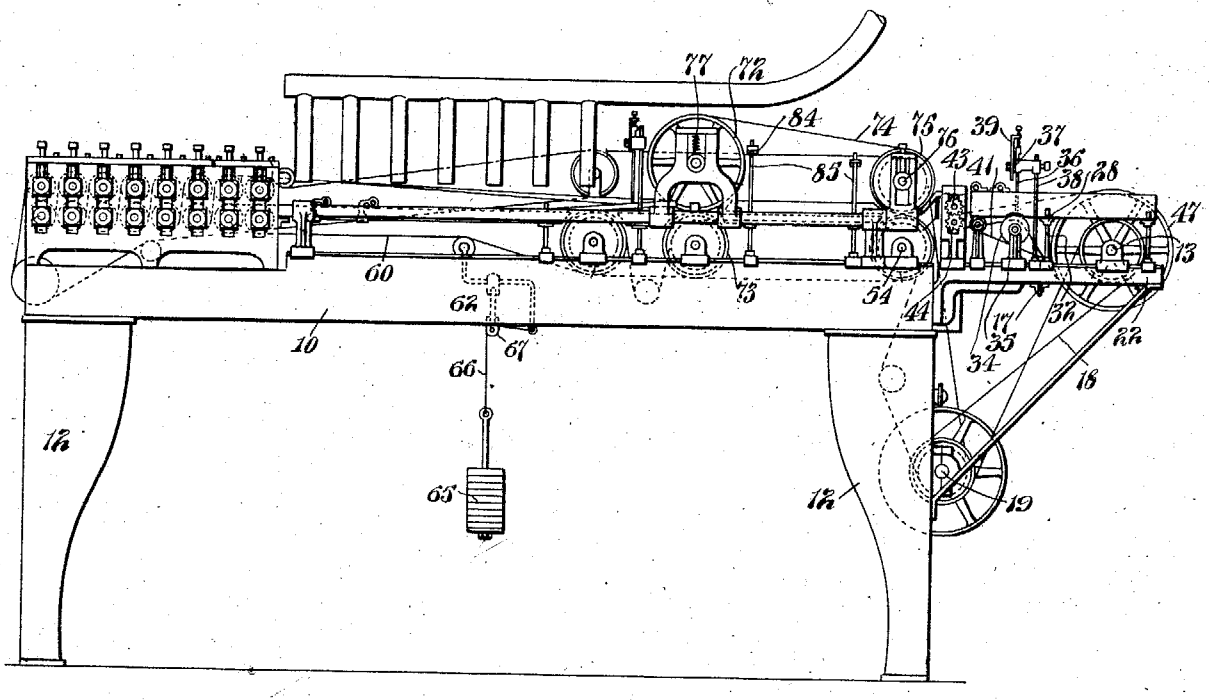

E. W. LABOMBARDE.

BOX FOLDING MACHINE.

APPLICATION FILED FEB. 21, 1910.

Reissued Jan. 31, 1911.

13,198.

3 SHEETS—SHEET 1.

Witnesses:
W. P. Abell
E. Batchelder

Inventor:
E. W. Labombarde;
By Wright, Brown, Quinby & Shoy
Attys.

E. W. LABOMBARDE.

BOX FOLDING MACHINE.

APPLICATION FILED FEB. 21, 1910.

Reissued Jan. 31, 1911.

13,198.

3 SHEETS—SHEET 2.

Witnesses:
W. P. Abell
E. Batchelder

Inventor:
E. W. Labombarde;
By Wright, Brown, Quinby & Shay
Attys.

E. W. LABOMBARDE.
BOX FOLDING MACHINE.
APPLICATION FILED FEB. 21, 1910.
Reissued Jan. 31, 1911.
13,198.
3 SHEETS—SHEET 3.
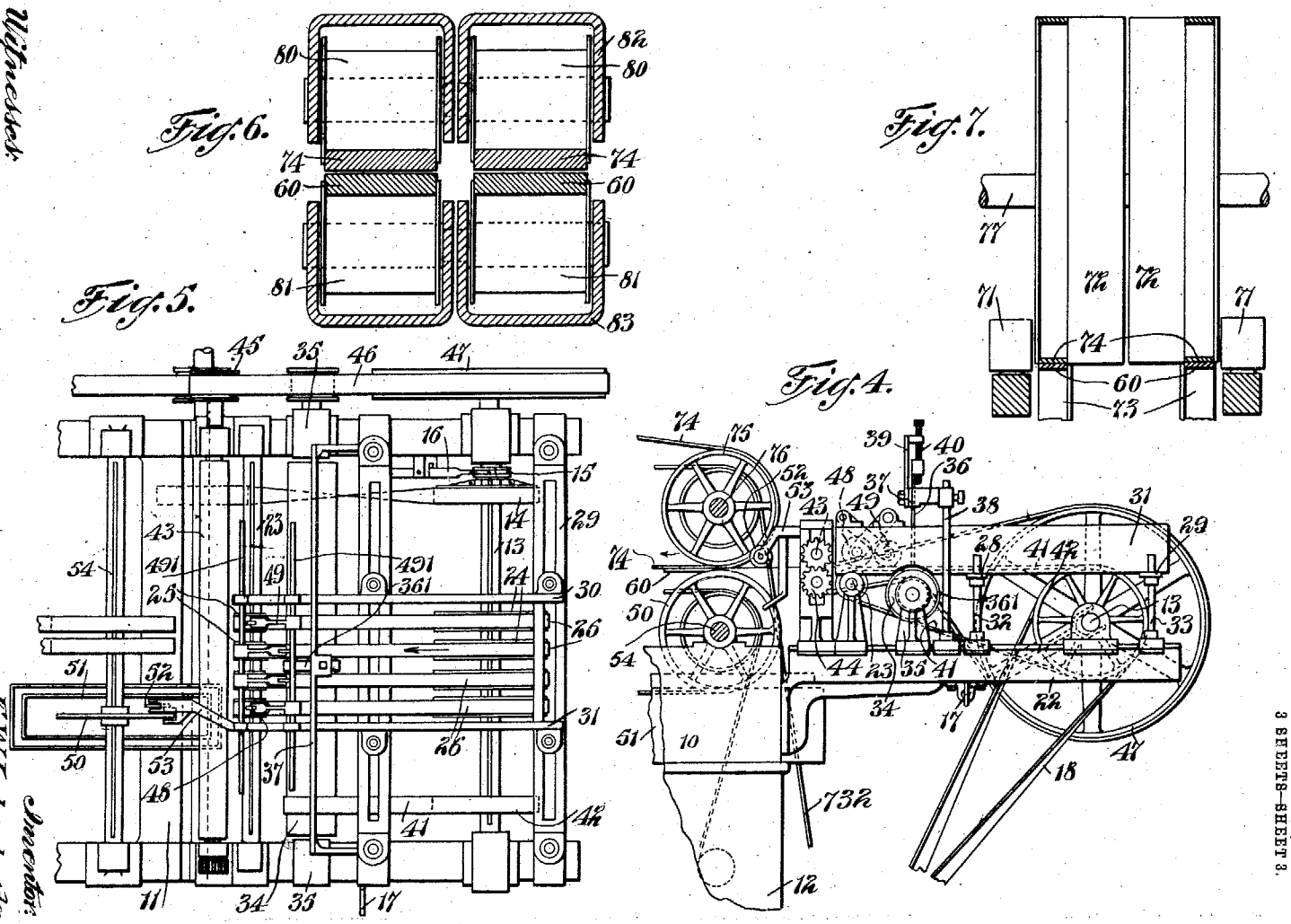
Witnesses:
W. P. Abell
E. Batchelder
Inventor:
E. W. Labombarde;
By Wright, Brown, Quinby & Shay
Attys.

UNITED STATES PATENT OFFICE.

ELIE W. LABOMBARDE, OF NASHUA, NEW HAMPSHIRE.

BOX-FOLDING MACHINE.

13,198. Specification of Reissued Letters Patent. Reissued Jan. 31, 1911.

Original No. 915,971, dated March 23, 1909, Serial No. 157,380. Application for reissue filed February 21, 1910. Serial No. 545,252.

*To all whom it may concern:*

Be it known that I, ELIE W. LABOMBARDE, of Nashua, in the county of Hillsboro and State of New Hampshire, have invented certain new and useful Improvements in Box-Folding Machines, of which the following is a specification.

This invention has relation to box making machinery, and more particularly to mechanisms for feeding separate blanks successively to the pasting, folding and pressing mechanisms.

Box blanks are made of relatively thin paper or cardboard, which are difficult to feed on account of their thinness and flexibility, and this difficulty is increased when it is desired to feed them rapidly and continuously. Various devices have been proposed for feeding pamphlets, and relatively thick blanks which are fairly rigid, or for feeding sheets intermittently, but these are not practical for feeding box blanks, either in that they are not organized to operate upon thin sheets or are incapable of feeding the blanks with the rapidity and accuracy that is essential in mechanisms such as must be employed in machines for which my invention is applicable. The machine illustrated attains these results being specially adapted to separate blanks of a very irregular form, the separation from a pile being effected by friction, and the rest of the machine automatically taking care of the proper spacing of the blanks and forwarding and folding them.

My invention is designed and has for its object to accomplish the feeding of separate box blanks of various widths and of thin and relatively flexible stock, successively and with great rapidity and accuracy. The feeding is accomplished, according to the illustrated embodiment of the invention, by supporting a pile of separate blanks upon a support consisting of a plurality of continuously moving belts. The front edges of the blanks in the pile engage a stop, the lower edge of which is separated from the plane of the belts by a narrow passageway or throat adequate to permit the passage of a single blank, but too small to permit the passage of two superimposed blanks. The belts extend for some distance beyond the stop so that, as the lowest blank in the pile is carried through the passageway, it is supported and prevented from bending until it is grasped by other instrumentalities in the machine. The belts themselves are flexible and are adapted to yield, and hence, to preserve the proper thinness of the passageway, I locate below the stop, which is in the form of a finger, a roll upon which the top stretches of the belts rest to prevent their sagging, and form on said roll a circumferential or peripheral flange which is directly under the stop. To cause the blank to be fed along by the belts as and after it emerges through the throat or passageway, at which time the weight of the pile of blanks is removed from the projecting portion, I employ one or more pressers which preferably take the form of rollers to engage the upper faces of the blanks and press them against the belts. At the end of the upper stretches of the belts are coacting rolls which grip the blanks and pass them on to the outer instrumentalities which form a part of the machine.

Figure 2:
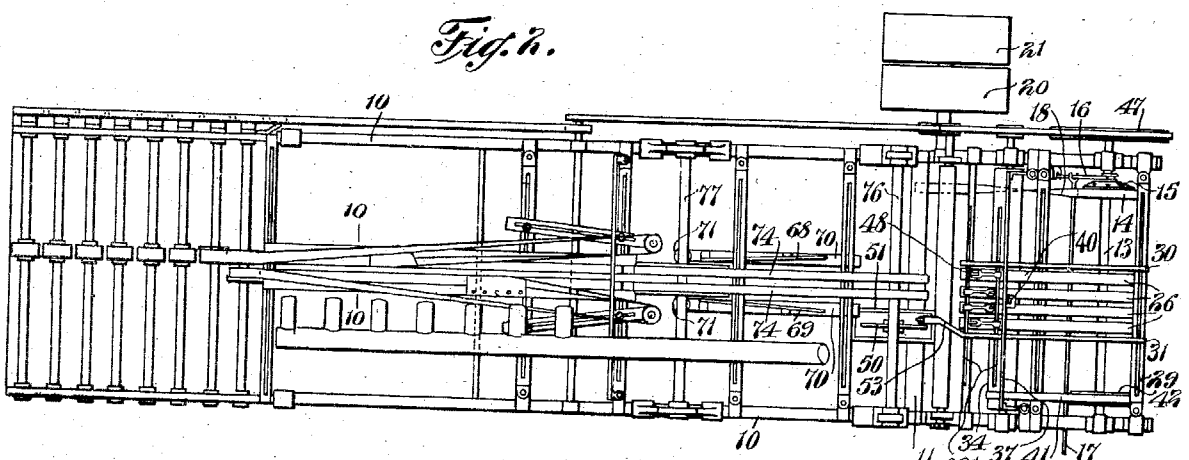
Figure 3:
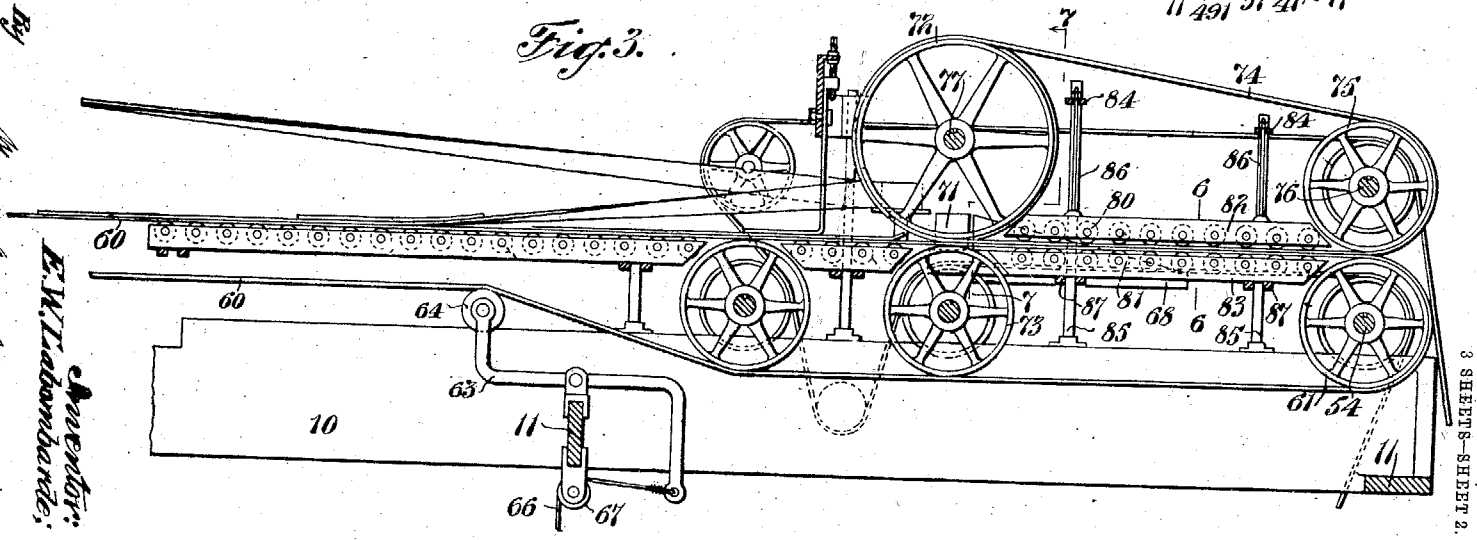

On the accompanying drawings,—Figure 1 is a side elevation of a machine embodying the invention. Fig. 2 represents a plan view of the machine. Fig. 3 represents a longitudinal section of that portion of the feeding mechanism which conveys each blank from the initial feeding mechanism to the instrumentalities by which it is folded and compressed. Fig. 4 illustrates in side elevation the initial feeding mechanism. Fig. 5 represents the same in plan view. Fig. 6 represents a section on the line 6—6 of Fig. 3. Fig. 7 represents a section on the line 7—7 of Fig. 3.

In the operation of the machine itself, it will be understood that the blanks are fed automatically to the pasting or gluing devices and are carried therefrom to the mechanism which folds the two flaps of the box, one upon the other, and compresses the overlapping portions to cause them to adhere.

As shown in Figs. 1 and 2, the machine, as a whole, includes a frame consisting of side bars 10 10 and cross-bars 11 11, supported by standards or uprights 12 12. The initial feeding mechanism is located at one end of the machine. At said end, there are secured to the frame brackets 22, in which is journaled a shaft 13, having loosely mounted thereon a pulley 14 adapted to be connected thereto by a clutch 15. This clutch may be actuated by a pivoted lever 16, and a rod 17 extending to the front of the machine. The pulley 14 is driven by a belt 18 from a prime power shaft 19, journaled on brackets on the standards 12. The shaft 19 is provided with fast and loose belt-pulleys 20 21. From this shaft 19 are driven all of the movable instrumentalities for operating upon the blanks. A third shaft 23 is journaled in bearings in the side bars 22, it being parallel with that at 13. To these two shafts 23 13 are splined a plurality of pulleys or wheels indicated at 24 25, respectively, and upon which are supported endless belts or carriers 26. The top stretches of these carriers or conveyers are horizontal, and they travel in the direction of the arrow in Fig. 5, so as to convey the blanks in succession to the next instrumentality which operates upon them. The pulleys 24 25 are adjustable longitudinally upon the shafts 13 23 to accommodate blanks of different lengths in the foundation of larger or smaller boxes. Supported upon cross-bars 28 29 are two adjustable boards or guides 30 31 which constitute a trough or guide for the blanks. The cross-bars 28 29 are supported by posts 32 33, respectively, secured at their lower ends to the brackets 22 and adjustable longitudinally thereof.

Arranged immediately below the upper stretches of the conveyers 26, and aiding in the support of the latter, there is a roll 34 which is journaled in brackets 35 35 and which has a circumferential flange 361 arranged between the two inner conveyers 26 and projecting upward so that said conveyers are substantially tangential to its periphery. Immediately above this flange, there is a stop or abutment for the pile of blanks consisting of an upright finger or bar 36, whose lower end is slightly elevated therefrom sufficiently to form a throat or passageway for the passage of a single blank. This finger is adjustably supported in a guide formed in a cross-bar 37, adjustably secured at its ends to upright posts 38 attached to the brackets 22. The cross-bar 37 has a bracket 39 downward through which a screw is passed into an enlargement on the upper end of the finger 36, so that said finger may be vertically adjusted with great nicety. The finger 36 and the peripheral flange 361 of the roll 34 form coacting members for permitting and effecting the passage of the lowermost blank of a pile of blanks placed in the trough with their ends resting against the finger 36. The roll 34 is driven at a peripheral speed equal to that of the conveyers 26, by a belt 41, driven by a pulley 42 on the shaft 13. As the blanks are fed one by one between the finger 36 and the roll, they are carried to a pair of coacting rolls 43. These rolls are provided with intermeshing gears 44 on their front ends, the lower roll being provided on its rear end with a pulley 45, driven by a belt 46 from a large pulley 47 on the shaft 13. These two rolls are placed close to the roll 23 so that the blank will be properly delivered to them. In order, however, that there shall be no danger of an improper presentation of the blanks to the rolls 43, and to hold the blanks against the conveyers, there are arranged above the upper stretch of the conveyers 26 idler rolls 48 48, mounted on swinging or yielding arms 49, as shown in dotted lines in Fig. 4, and in plan view in Fig. 5. The said swinging arms are loosely journaled on cross-shafts 491, whose ends are supported by the guide-boards 30 31. The adjustable rollers 48 are adjustable toward and from the abutment 36 and the shaft 23, respectively. The roll 48, which is nearest the finger or abutment 36, engages the blank as its end emerges from under the abutment 36. As the blanks leave the initial feeding mechanism, one end of the longer flap of each one is coated with paste by any suitable mechanism as a wheel 50 projecting from a glue receptacle 51. As the blanks emerge from the rolls 43, 43, they are engaged by a second feeding mechanism comprising parallel endless conveyers which receive the blanks and carry them through the devices which fold over the flaps along the scored or creased lines. In actual practice, two of these endless conveyers, as indicated at 60 60, are sufficient. The employment of two separated conveyers for grasping each blank on two different lines is an important feature, as it insures the passage of the blank through the machine without danger of its becoming dislocated; and further the adjustability of the two pairs of coacting belts permits the belts to be so placed that their outer edges will register with the scored lines on which the flaps are to be folded. Said conveyers have their upper stretches in the same horizontal plane with the conveyers of the feeding mechanism. They are stretched around wheels or pulleys 61 on the shaft 54, at the receiving end of the machine, and around pulleys forming a portion of the compression mechanism, which will be subsequently described. It is sufficient at present to state that these belts are caused to travel in the direction of the arrows in Fig. 4. The belts and the pulleys upon which they are supported are adjustable toward and from each other to accommodate blanks of different sizes. The two belts 60 60 are kept taut by belt-tighteners, indicated as a whole in Fig. 1 at 62. Each tightener consists of a lever 63 having a wheel 64 loosely engaging the belt-conveyer and a weight 65, connected by a flexible cord 66 passing over an idler 67 to the end of the lever 63.

Coacting with the conveyers 60 and moving at the same speed, are two endless conveyers 74 74 passing around the wheels 72, which are adjustably mounted upon a shaft 77 yieldingly journaled in bearings 761. Said conveyers 74 are also supported by wheels 75 adjustable on a shaft 76. Power is supplied to the shaft 77 and to the shaft 54 in any convenient manner. It will be understood that all of the wheels, which support the belts 60 60 and 74 74, are adjustable so that blanks of greatly differing widths may be treated by the machine. The parallel coacting stretches of the belts or conveyers 60 60 and 74 74 are caused to grip the blanks between them by reason of a series of pressure rollers 80 placed above, and a series of pressure rollers 81 placed below said stretches, as shown in Fig. 3. These rollers, as illustrated in Fig. 6, are journaled in the sides of the U-shaped angle bars 82 83. The angle bars 82 are supported by hangers 86 from crossbars 84, and the angle bars 83 are supported by crossbars 87, said crossbars 84 and 87 being supported by the uprights 85. By reason of these rolls, the conveyers are caused to grip the blanks and to carry them forward without danger of their being dislocated. The conveyers 41, 60 and 74 are formed of such material and in such way that they are not liable to change or shrinkage under different atmospheric conditions as to interfere with their affording the needed support to the blanks in the proper line of conveyance. Preferably each conveyer consists of a plurality of layers of a strong, substantially non-extensible duck or canvas, stitched together and saturated and cemented together by a suitable flexible cement such as a substance containing rubber. The operative faces of the conveyers are coated with a layer of this substance, so that they afford a frictional surface for engaging the faces of the blanks. I have found that rubber cement, consisting of caoutchouc, gasolene, or naphtha and shellac, forms a suitable substance for the purpose stated.

It will now be understood that the belts 26 and the finger 36 and immediately cooperating devices constitute a first feeding mechanism which acts to separate the blanks singly from the bottom of a pile by friction. Of course, as soon as the bottommost blank passes under the finger 36, the next one is free to follow it immediately.

The feeding mechanism, as herein set forth, is capable of delivering practically a continuous stream of box blanks to the various instrumentalities, which operate upon them, with the greatest rapidity and accuracy.

Having thus explained the nature of the invention, and described a way of constructing and using the same, although without attempting to set forth all of the forms in which it may be made, or all of the modes of its use, I declare that what I claim is:

1. In a blank-feeding mechanism for the rapid and continuous delivery of paper blanks to the gluing and folding devices of an automatic box machine, the combination of the following elements, viz: a continuously moving support arranged to carry a pile of blanks thereon and having a friction surface for successively engaging and feeding the lowermost blanks of said pile, means for imparting movement to said support, a single normally stationary depending finger located intermediate of the lateral boundaries of said support, said finger serving unaided to control the passage of the blanks as they are fed by said support, and means for adjusting said finger with relation to said support so as to permit the passage of a single blank at a time, said support being also arranged to carry the separated blanks after they successively pass said finger.

2. In an automatic blank-feeding apparatus for rapidly and continuously feeding blanks, the combination of a flexible endless carrier, the upper stretch of which forms a flat surface for supporting a pile of blanks, means for continuously moving said carrier, an adjustable finger separated from the upper stretch of the carrier to form a passageway or throat for the passage of single blanks successively from the bottom of the pile, and a roll having a peripheral flange located directly below said finger to coact therewith and tangential to the blank-supporting surface of the carrier, substantially as set forth.

3. In an automatic blank-feeding apparatus for rapidly and continuously feeding blanks, the combination of an endless carrier forming a plane surface for supporting a pile of blanks, an adjustable finger located above said carrier between the ends of the upper stretch thereof and separated therefrom to permit the passage of single blanks successively from the bottom of the pile, said finger serving unaided to control the passage of the blanks and a roll located above said carrier in proximity to said finger for engaging and pressing each blank against said carrier, substantially as set forth.

4. In a machine of the character described, the combination with a roll having a peripheral flange as at 361 and a finger as at 36 separated by a space, to permit the successive passage of single blanks, of a plurality of endless belts having their upper stretches projecting on both sides of the finger and arranged with their supporting faces substantially tangential to the flange of said roll, and means for adjusting said finger toward and from said roll and said belts.

5. In a machine of the character described, the combination with an endless carrier, and pulleys on which it is supported substantially horizontally to produce a plane blank-supporting surface, of a finger arranged at substantially right angles to the plane of the upper stretch of said carrier and located between the pulleys with its lower end separated from the carrier by a space slightly greater than the thickness of a blank, said finger serving unaided to control the passage of the blanks whereby said carrier sustains a pile of blanks and feeds the bottom ones singly and successively under said finger, a roll above said carrier to engage the blank and press it against the face of the said carrier, and a pair of blank-gripping rolls to engage blanks delivered thereto by said endless carrier.

6. In a machine of the character described, the combination with an endless carrier, and continuously driven pulleys on which it is supported substantially horizontally, of a finger arranged at substantially right angles to the plane of the upper stretch of said carrier and located between the pulleys with its lower end separated from the carrier by a space slightly greater than the thickness of a blank, a roll located beyond the finger for holding the blanks against the carrier, and a roll for supporting said belts between said pulleys, having a peripheral flange coacting with the end of said finger.

7. In a machine of the character described, a feeding mechanism comprising a plurality of endless belts, rotary members for supporting and continuously actuating said belts, a stationary finger above said belts arranged to permit the lowest blank of a pile placed on said belts to be fed thereby singly and successively beneath said finger, an idler roll below said finger for supporting the belts between said rotary members and having a peripheral portion tangential to the plane of the supporting surfaces of said belts, and rolls located in proximity to said finger and bearing downward constantly against the blanks on the belts.

8. In a machine of the character described, the combination with a pair of feeding belts, of a pair of belts arranged thereabove and having their lowest stretches in proximity to and parallel to the top stretches of the first-mentioned belts, and a plurality of loose rollers with frames in which they are journaled arranged between the stretches of each belt and above and below the coacting stretches of each pair of belts for causing said stretches to grip a blank between them, and carry it forward without dislocation or change of position.

9. In a blank-feeding apparatus of the character referred to, the combination with the roll having a peripheral flange as at 361, the finger or abutment thereabove, the yielding roller as at 48, and the belt or carrier 26 whose blank-supporting surface is substantially tangential to the periphery of the said flange, all arranged and operating as described.

10. In a machine of the character described, the combination with a feeding belt, of a belt arranged thereabove and having its lowest stretch in proximity to and parallel to the top stretch of the first-mentioned belt, and a plurality of loose rollers with frames in which they are journaled arranged between the stretches of each belt and above and below the coacting stretches thereof for causing said stretches to grip a blank between them and carry it forward without dislocation or change of position.

11. In a machine of the character described, a blank-forwarding belt having its operative face coated with non-abrasive friction-producing material differing from the material of the belt itself.

ELIE W. LABOMBARDE.

Witnesses:

A. W. Harrison,

Jas. H. Churchill.